United States Patent
Rose et al.

(10) Patent No.: US 6,598,443 B2
(45) Date of Patent: Jul. 29, 2003

(54) BLIND BORE HUB AND METHOD OF FORMING

(75) Inventors: Anthony J. Rose, Independence, OH (US); Randy J. Monahan, Lakewood, OH (US)

(73) Assignee: A. J. Rose Manufacturing Co., Avon, OH (US)

( * ) Notice: Subject to any disclaimer, the term of this patent is extended or adjusted under 35 U.S.C. 154(b) by 99 days.

(21) Appl. No.: 09/843,482

(22) Filed: Apr. 26, 2001

(65) Prior Publication Data

US 2001/0035035 A1 Nov. 1, 2001

Related U.S. Application Data

(60) Provisional application No. 60/199,914, filed on Apr. 26, 2000.

(51) Int. Cl.[7] .............................. B21B 1/00; B21D 22/14
(52) U.S. Cl. ........................... 72/71; 72/82; 29/894.362
(58) Field of Search ................................ 72/71, 82, 83, 72/110; 29/894.362; 474/168, 170

(56) References Cited

U.S. PATENT DOCUMENTS

| | | | |
|---|---|---|---|
| 3,080,644 A | 3/1963 | Previte | 29/159 |
| 3,772,928 A | 11/1973 | Gobeille | 74/230.7 |
| 3,851,366 A | 12/1974 | Jacobs | 29/159 |
| 3,964,326 A | 6/1976 | Mickus | 74/230.05 |
| 3,994,181 A | 11/1976 | Sproul | 74/230.8 |
| 4,781,659 A | 11/1988 | Gebhardt | 474/94 |
| 4,824,422 A | 4/1989 | Jocic | 474/170 |
| 4,951,797 A | 8/1990 | Booth | 192/107 |
| 4,996,859 A | 3/1991 | Rose | 72/86 |
| 5,049,115 A | 9/1991 | Kunkel | 474/166 |
| 5,195,241 A | 3/1993 | Bradfield | 29/892 |
| 5,308,289 A | 5/1994 | Funahashi | 474/94 |
| 5,441,456 A | 8/1995 | Watanabe | 474/94 |
| 5,465,485 A | 11/1995 | Miyake | 29/892.11 |
| 5,591,093 A | 1/1997 | Asai | 474/94 |
| 5,619,879 A | 4/1997 | Friese | 72/82 |
| 5,823,904 A | 10/1998 | Hodjat | 474/170 |
| 5,829,291 A | 11/1998 | Tanaka | 72/71 |
| 5,947,853 A | 9/1999 | Hodjat | 474/166 |
| 5,951,422 A | 9/1999 | Roes | 474/94 |
| 5,987,952 A | 11/1999 | Kutzscher | 72/71 |
| 6,105,410 A * | 8/2000 | Sauberlich et al. | 72/71 |
| 6,381,847 B1 * | 5/2002 | Kanemitsu et al. | 29/892.3 |
| 6,427,329 B2 * | 8/2002 | Monahan et al. | 29/894.362 |
| 6,434,991 B1 * | 8/2002 | Jaschka | 72/71 |

\* cited by examiner

*Primary Examiner*—Ed Tolan
(74) *Attorney, Agent, or Firm*—Pearne & Gordon LLP

(57) ABSTRACT

A method for forming a hub having blind bore with an elevated blind bore face is provided. The blind bore face is elevated relative to the upper surface of an annular disc from which the hub is integrally formed, by first displacing metal radially inward from the upper surface toward the center of the disc to form an elevated surface with a hole therethrough, and second displacing metal radially inward, again from the upper surface toward the center of the disk, to form a hub which incorporates a blind bore having an elevated surface. A blind bore hub formed by the foregoing method is also provided.

5 Claims, 2 Drawing Sheets

BLIND BORE HUB AND METHOD OF FORMING

This application claims the benefit of U.S. Provisional Patent Application Serial No. 60/199,914 filed Apr. 26, 2000.

BACKGROUND OF THE INVENTION

This invention relates to pulleys and more particularly to pulleys having integral hubs that are formed from sheet metal blanks. There are a variety of techniques employed in the fabrication of pulleys having hubs. One such technique involves spin forming the web and rim from a sheet metal blank, machine forming a hub, and attaching the hub to the web by welding or brazing. While this technique facilitates the formation of a hub having a complex shape, the separate operations involved add significant costs to the pulley. More recent techniques involve the radial displacement of metal from a sheet metal disc to integrally form a hub having a blind bore therein. Such a technique is described in U.S. Pat. No. 5,987,952. According to that patent, a shaping roller is pressed against a face of a spinning annular disc of sheet metal while the disc is supported at its opposite face with a rotating head stock mandrel. The shaping roller is moved progressively radially inwardly against the face of the rotating disc to displace a portion of metal in the form of a traveling annular wave while thinning the disc. The annular wave is pressed against a rotating, axially extending stepped mandrel with an end sized to press and hold an annular inward portion of the disc. The wave, which is pressed against the mandrel, forms the hub and the annular inward portion held by the mandrel becomes a blind bore for the hub.

A disadvantage of a blind bore formed in accordance with the aforementioned patent is that its location in the bore will not position a bearing close to an ideal location within the hub. It is desirable for the bearing to be located near a centered location in the hub for uniform loading of the bearing. It is desirable, therefore, to produce a hub in which the blind bore provides a stop at a location that is spaced from the web end a distance greater than the thickness of the original sheet metal.

SUMMARY OF THE INVENTION

This invention provides a method of forming a blind bore hub integrally with a circular disc of sheet stock, wherein the blind bore acts as a stop within the hub at a location that is spaced a greater distance from the web end of the hub than the thickness of the original sheet stock.

According to the invention, an annular disc is provided having an initial thickness and a center hole diameter substantially corresponding to the inside diameter of the hub to be formed. The disc is placed on a head stock mandrel and is spun while a shaping roller engages the disc and is moved progressively radially inwardly from a position about halfway between the edge of the disc and the center of the disc. The roller is also moved downwardly at a slight angle to move metal toward the center of the disc. A stepped mandrel is positioned in the hole of the disc with a small diameter portion extending through the hole and a larger diameter portion being positioned above the top face of the disc. As the roller moves toward the center of the disc, metal is forced into contact with the smaller diameter portion of the mandrel and upwardly toward the larger diameter portion of the mandrel to define a reduced diameter hole in the disc having a periphery which is above the plane of the disc face.

After this initial operation, the roller is backed off to a position proximate the rim of the disc and is moved progressively radially inwardly against the face of the rotating disc to displace a portion of metal in the form of a traveling annular wave while thinning the disc. The annular wave is pressed against the larger diameter portion of the rotating mandrel to form the hub and the previously formed metal which surrounds the smaller diameter portion of the mandrel forms a blind bore within the hub.

DETAILED DESCRIPTION OF THE DRAWINGS

Figure 1:
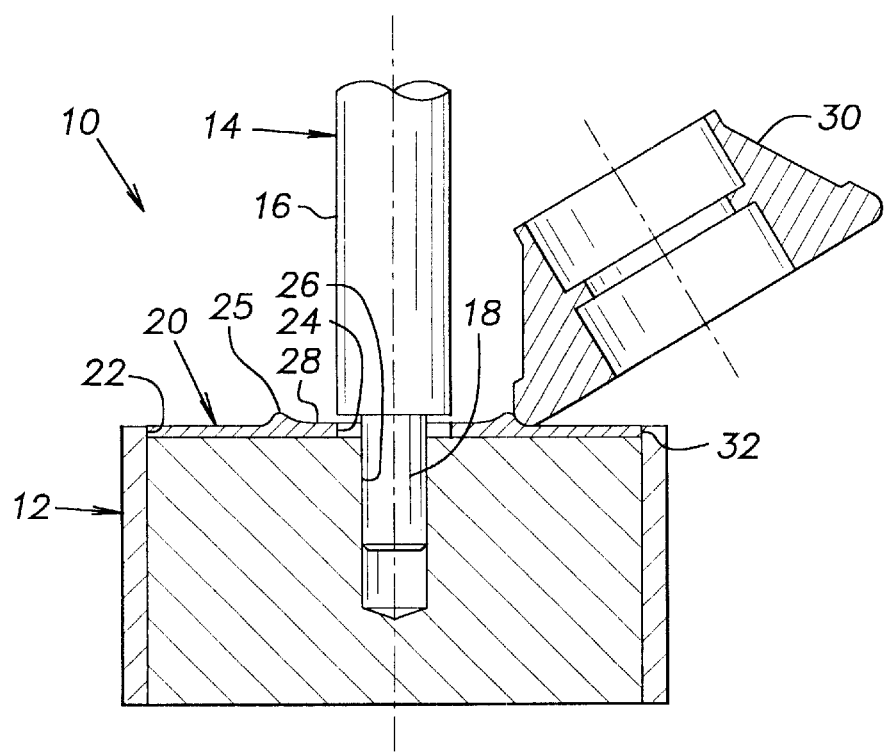
FIG. 1 is a schematic illustration of a hub and blind bore formation operation at an initial stage.

Referring now to the drawings, there is illustrated a spin-roll forming machine 10. The machine 10 includes a head stock mandrel 12 and a stepped mandrel 14 having a larger diameter portion 16 and a smaller diameter portion 18. An annular disc 20 of sheet metal having an initial thickness is positioned within a circular recess 22 on the head stock mandrel 12. The annular disc has a center hole 24 having a diameter which corresponds to the inside diameter of a hub to be formed in a finished pulley. The smaller diameter portion 18 of the stepped mandrel 14 is positioned in a center bore 26 of the head stock mandrel 12 so that the base of larger diameter portion 16 is spaced slightly above an upper face 28 of the disc 20. The base of portion 16 is maintained at an elevation above face 28 corresponding to a desired stop for properly positioning a hub bearing in the blind bore. With the stepped mandrel 14 held or maintained firmly such that the base of larger diameter portion 16 remains at the desired elevation, but being permitted to spin about its longitudinal axis, a shaping roller 30 is brought into contact with the face 28 of the disc 20 at a position about halfway between the edge 32 of the disc 20 and the center hole 24 as shown in FIG. 1.

Figure 2:
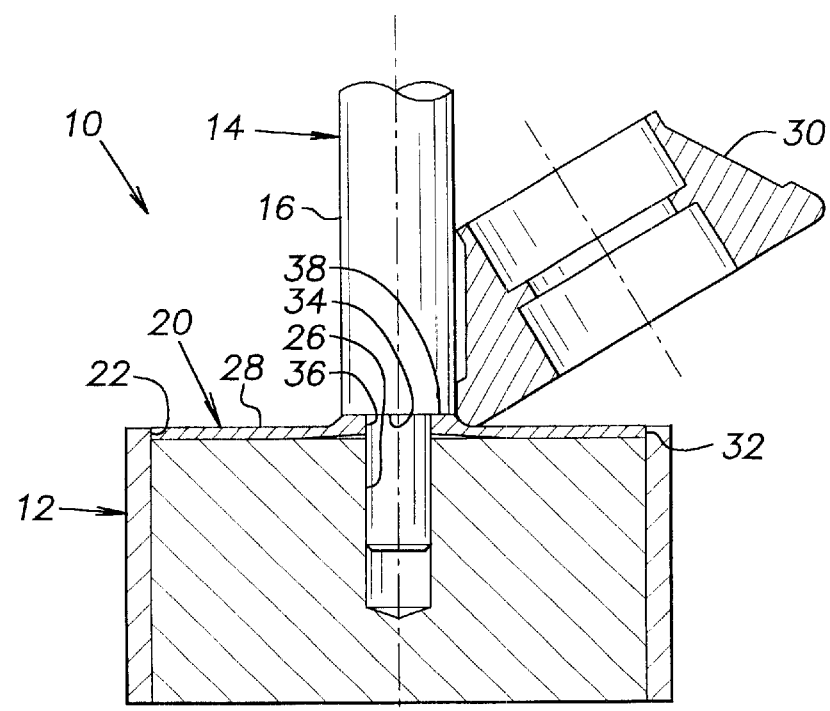
FIG. 2 is a schematic illustration similar to FIG. 1, but showing the operation at a later stage.

The head stock mandrel 12 is driven in a circular direction and the shaping roller 30 is moved inwardly toward the center of the disc 20 at a slight downward angle sufficient to form a first traveling annular wave 25 of metal which accumulates sufficient volume to attain the shape illustrated in FIG. 2. As the shaping roller 30 moves in this fashion toward the center of the disc 20, metal accumulated from the wave is forced into contact with the smaller diameter portion 18 of the stepped mandrel 14, as may be seen in FIG. 2. As may also be seen in FIG. 2, metal is forced upward against the annular overhang or rim portion 34 between the portions 16 and 18. This forming operation provides a work hardened opening 36 in the disc 20 which is smaller than the center hole 24 and provides an elevated face 38 which is above the original plane of the face 28 of the disc 16 having its initial thickness.

As will become apparent, the opening 36 and the face 38 will form the bore opening diameter and inner face, respectively, of a blind bore. It is important that the metal be forced into uniform contact with the smaller diameter portion 18. Any gaps left around the portion 18 may affect the uniformity of metal that is pressed to form the hub in the following operation.

Figure 3:
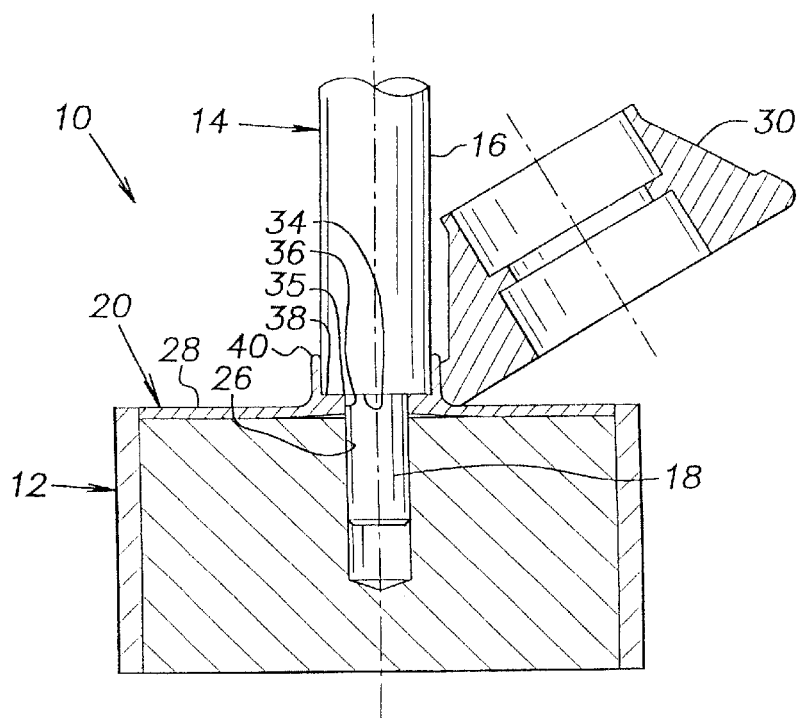
FIG. 3 is a schematic illustration similar to FIG. 2, but showing the operation at a still later stage.

After this initial operation, the shaping roller 30 is backed off to a position proximate the edge 32 of the disc and is moved progressively radially inwardly against the face 28 of the rotating disc 20 to displace a portion of the metal in the form of a second traveling annular wave while thinning the disc. Referring to FIG. 3, the second annular wave is pressed against the larger diameter portion 16 of the stepped mandrel 14 to form a hub 40.

Figure 4:
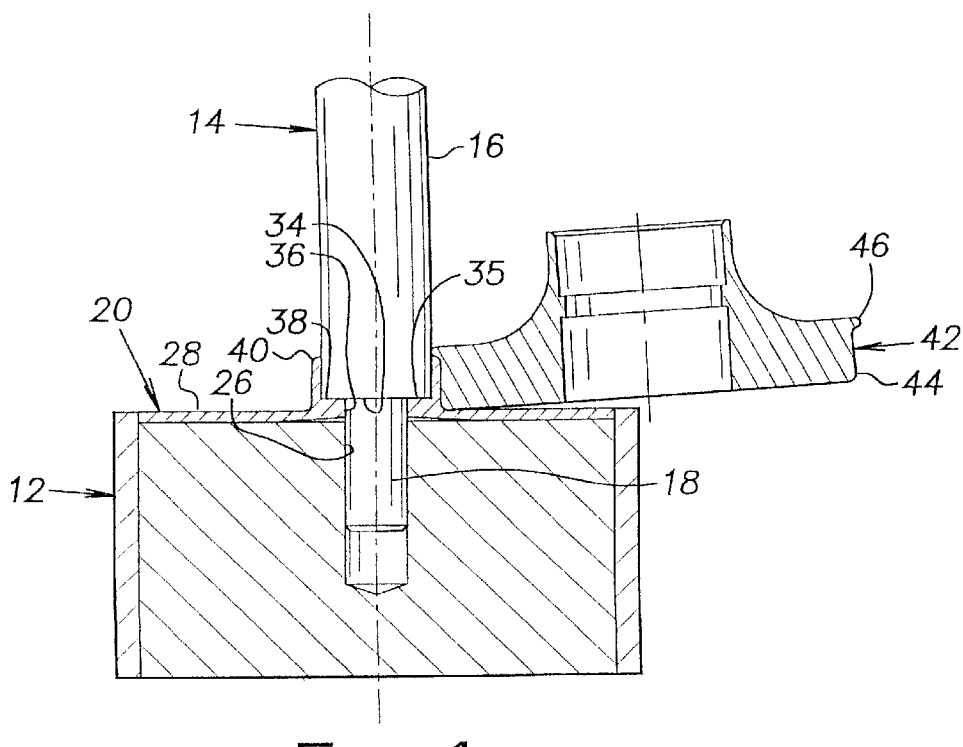
FIG. 4 is a schematic illustration similar to FIG. 3, but showing the operation at a final stage.

Referring now to FIG. 4, the shaping roller 30 is removed and a final finishing roller 42 is positioned so that a tapered surface 44 thereof is pressed against the hub 40 such that the surface 44 is substantially parallel with the mandrel 14. In this manner, metal in hub 40 is pressed against an annular ridge 46 of finishing roller 42 to shape the terminal edge of the hub 40.

As can be seen in FIGS. 3 and 4, face 38 forms the inner face of blind bore 35, and opening 36, corresponding to the smaller diameter portion 18 of stepped mandrel 14, forms a blind bore opening 36 having diameter that is smaller than the inner hub diameter. The inner hub diameter corresponds to the larger diameter portion 16 of stepped mandrel 14.

Once hub 40 has been formed, disc 20 incorporating the hub can be further worked, machined, shaped, or combined with other elements as well known in the art to form a pulley that incorporates a hub 40 with a blind bore 35 according to the invention.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extend to which the progress in the art has been advanced by the invention.

What is claimed is:

1. A method of forming a hub having a blind bore comprising the steps of:
    a) providing an annular disc having an initial thickness and a center hole therein;
    b) placing said disc on a head stock mandrel and spinning said disc;
    c) positioning a stepped mandrel in said center hole of said disc, said stepped mandrel having a smaller diameter portion extending through said hole and a larger diameter portion being positioned above an upper face of said disc;
    d) engaging an upper surface of said disc with a shaping roller and moving said shaping roller progressively radially inward from a position about halfway between an edge and the center hole of said disc along said upper face thereof, thereby displacing metal from said upper face as a first traveling annular wave toward the center hole of said disc and forcing metal into contact with said smaller diameter portion of said stepped mandrel, further forcing metal upward toward said larger diameter portion of said stepped mandrel, to provide an elevated surface above the plane of said upper face of said disc with a reduced diameter hole therein;
    e) backing off said shaping roller to a position proximate the edge of said disc and re-engaging said shaping roller against said upper surface of said disc, moving said shaping roller progressively radially inward to displace a portion of metal in the form of a second traveling annular wave while thinning said disc; and
    f) pressing said second annular wave against said larger diameter portion of said stepped mandrel to form a hub having a blind bore, said reduced diameter hole and said elevated surface respectively forming a bore opening and a blind bore face of said blind bore of said hub.

2. A method according to claim 1 further comprising the step of pressing a finishing roller against said hub, said finishing roller having an annular ridge adapted to shape a terminal edge of said hub.

3. An apparatus for forming a hub having a blind bore from an annular disc, said apparatus comprising a head stock mandrel having a center bore therein, a stepped mandrel, a shaping roller, and a finishing roller, said stepped mandrel comprising a larger diameter portion corresponding to a desired inner diameter of a hub to be formed, and a smaller diameter portion corresponding to a desired diameter of a bore opening to be formed, said smaller diameter portion being received in said center bore of said head stock mandrel, said finishing roller comprising an annular ridge to shape a terminal edge of said hub.

4. An apparatus according to claim 3, wherein said larger diameter portion of said stepped mandrel comprises a base thereof located at an annular intersection of said larger and smaller diameter portions, said base of said larger portion being maintained at a position initially spaced from said disc.

5. An apparatus according to claim 3, said smaller diameter portion of said stepped mandrel extending a substantial distance into said center bore of said head stock mandrel.

* * * * *